Dec. 24, 1929. B. LURIE 1,740,773
DENTAL IMPRESSION TRAY
Filed Oct. 18, 1926
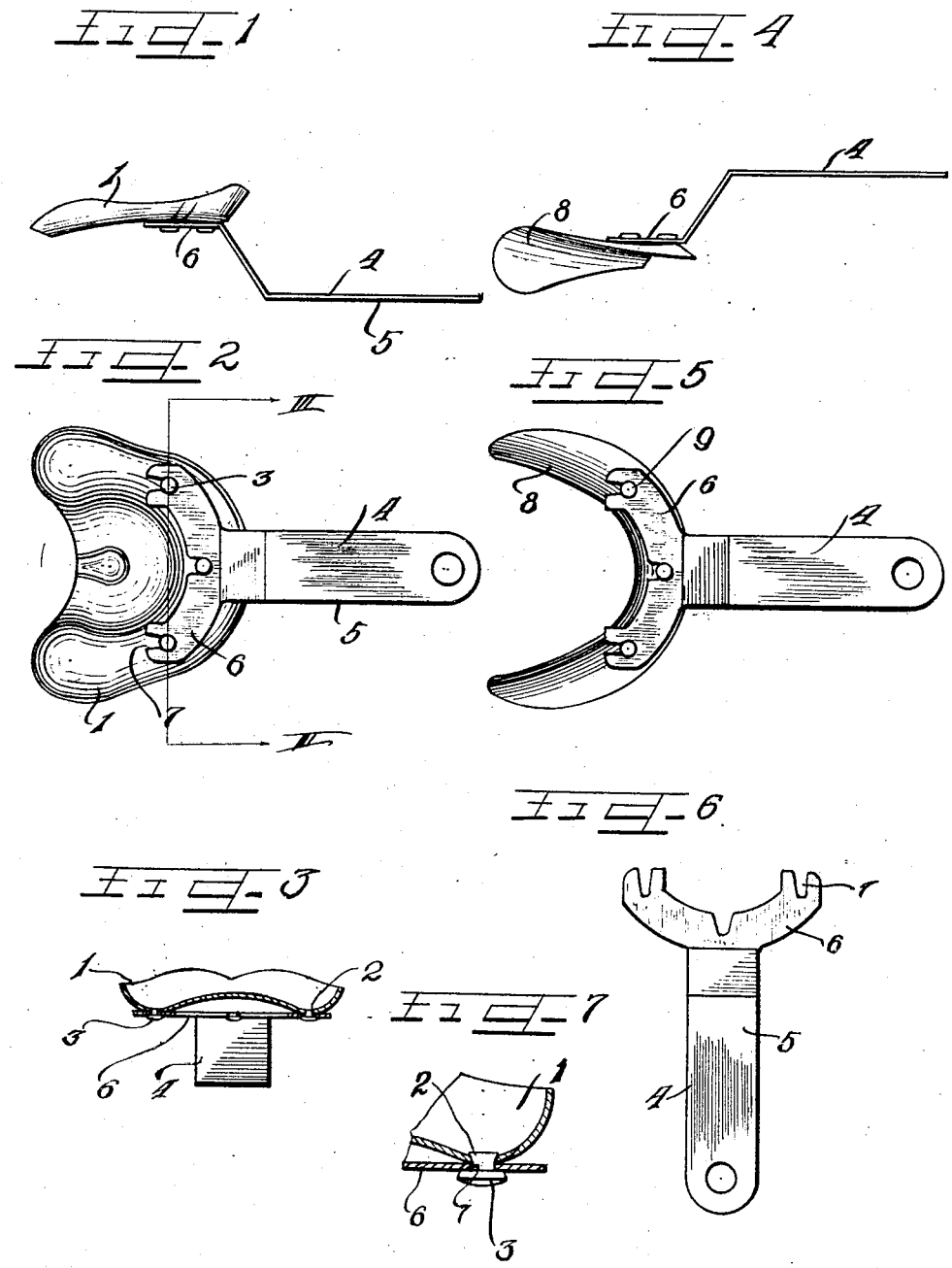
INVENTOR
Benjamin Lurie
by Charles W. Hills
Attys Patented Dec. 24, 1929

1,740,773

UNITED STATES PATENT OFFICE

BENJAMIN LURIE, OF CHICAGO, ILLINOIS

DENTAL IMPRESSION TRAY

Application filed October 18, 1926. Serial No. 142,329.

This invention relates to dental impression trays used in modeling compound technique.

Trays of the type hereinafter described are used in taking impressions in connection with the making of artificial dentures. Originally, such trays were made with integral handles, but with the development of the technique, detachable handles were devised in order that the mouth muscles and jaw movements might be freely worked while the tray containing the modeling compound was kept in the mouth. This permitted artificial dentures to be individually fitted with great accuracy and with corresponding comfort to the user. However, the detachable handles devised have not proven entirely satisfactory for the reason that they are in general awkward to detach or else do not provide the necessary rigidity and stability required. In certain devices on the market, the trays are provided with thickened slotted portions into which the handle fits. This construction destroys the balance of the tray and is undesirable. In other devices, loops for receiving the handle have been struck downwardly from the bottom of the tray. This is objectionable for the reason that the handle projects into the modeling compound and is liable to get stuck.

This invention, therefore, has for one of its objects to provide a dental impression tray and a detachable handle therefor that may be readily attached to or detached from the tray and that does not come into contact with the modeling compound.

It is a further object of this invention to provide a rigid detachable handle for a dental impression tray adapted to afford a widely distributed three-point support for the tray, whereby pressure may be equally transmitted through the handle to the tray in the taking of impressions.

It is a further important object of this invention to provide an improved handle for dental impression trays which because of its offset construction, allows free movement of the lips and jaws when in attached position.

Other and further important objects of this invention will be apparent from the disclosures in the specification and the accompanying drawings.

On the drawings:

Figure 1 is a side elevational view of an upper dental impression tray embodying the principles of this invention.

Figure 2 is a bottom plan view of the same.

Figure 3 is a sectional view taken on line III—III of Figure 2.

Figure 4 is a side elevational view of a lower dental impression tray.

Figure 5 is a top plan view of the same.

Figure 6 is a top plan view of the handle detached from the tray.

Figure 7 is an enlarged detail section with parts shown in section.

As shown on the drawings:

Referring to Figures 1 to 3 inclusive, the reference numeral 1 indicates a dental impression tray adapted more particularly for taking impressions of the upper jaw in connection with the use of modeling compound for forming artificial dentures. Said tray is preferably formed of nickel, stamped into the desired shape by means of a suitable die. The trays of my invention are, in general, shorter than those in present use and do not extend back so far when placed in the mouth. Secured to the tray 1 and projecting from the under side thereof, are a plurality of pins or hollow rivets 2, said rivets 2 being formed with enlarged heads 3. The rivets 2 are preferably three in number and are so spaced and positioned as to lie with their heads 3 in the same horizontal plane.

In order to carry the tray 1 and to support the same in position in the mouth, a handle 4 (Figure 6) is provided. Said handle 4 comprises a rigid flat strip of metal affording a handle portion 5 and provided with an upwardly offset end 6 lying in a plane parallel to said handle portion 5. Said end 6 is in general arcuate shaped to conform with the base of the tray 1 and is provided with slots 7 extending longitudinally of the handle portion 5. Said slots 7 are slightly tapered inwardly from the edge of the end 6 and are adapted to receive the shanks of the pins or rivets 2, the length of said shanks being substantially equal to the thickness of the end 6, whereby the heads 3 of said rivets frictionally engage the upper edges of the slots 7 (Figure 7) and securely hold the handle in engagement with the tray.

In Figures 4 and 5, there is shown a tray 8 for taking impressions of the lower jaw. While the form of the tray 8 is different from that of the tray 1, the pins or rivets 9 are similar to the rivets 2 and are similarly positioned so that the handle 4 may be interchangeably used for supporting the tray 8. It will be appreciated that the method of positioning the rivets 2 or the rivets 9, which are preferably three in number, affords a three-point support for the handle 4 and permits a force or pressure applied through the handle 4 to be equally distributed through the tray and the modeling compound which it supports, to the jaw. This is very essential in the taking of dental impressions, since the nicety of fit obtained is largely dependent upon the equalization of the pressure on different parts of the jaw.

In the technique of making dental impressions, the tray is filled with a modeling compound and inserted by means of the handle into the mouth. Pressure is then applied through the handle to make the impression of the jaw in the modeling compound. The offset feature of the handle permits the tray to be retained in the mouth with the handle in place while the patient moves the lips, the handle not interfering with perfect freedom of movement. After this, the handle is removed and the jaw and face muscles worked, giving the correct contour to the modeling compound. For this purpose, the modeling compound may be warmed slightly between successive operations. In general, this procedure necessitates attaching and detaching the handle a number of times before a satisfactory impression is made. For this reason, the ease with which the handle may be attached or detached is an important factor. In the construction above described, it will be appreciated that my improved handle may be very readily attached to or detached from the tray by means of a slight force applied through the handle and parallel thereto. The slight taper of the slots 7 permits the shanks of the rivets 2 and 9 to be resiliently engaged with just sufficient pressure to prevent accidental disengagement. Any tendency of the handle to be disengaged from the tray due to a force normal to the plane of the handle is prevented by the enlarged heads 3 which normally grip the end 6 of the handle.

It is thus apparent that the construction of my improved tray and removable handle afford means for the ready attachment to and detachment from the tray, of the handle, and at the same time affords a rigid engagement between the tray and the handle.

I am aware that many changes may be made, and numerous details of the construction may be varied through a wide range without departing from the principles of this invention, and I therefore do not purpose limiting the patent granted hereon, otherwise than necessitated by the prior art.

I claim as my invention:

A dental impression tray, a plurality of pins secured to said tray, the pins each having an integral head and being widely spaced one from the other, and a handle terminating in an offset end having substantially parallel longitudinal slots therein adapted to receive the pins, the pins being so positioned and the offset end being so formed that when the handle is in its operative position on the tray a portion of the tray extends rearwardly of the offset end to form an abutment against which a finger of the user of the tray may engage while he disengages the handle by applying a force parallel to the handle.

In testimony whereof I have hereunto subscribed my name.

BENJAMIN LURIE.